(12) United States Patent
Ritt

(10) Patent No.: US 8,370,987 B2
(45) Date of Patent: Feb. 12, 2013

(54) WIPER BLADE

(75) Inventor: Jean-Marc Ritt, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 12/680,866

(22) PCT Filed: Sep. 23, 2008

(86) PCT No.: PCT/EP2008/062687
§ 371 (c)(1),
(2), (4) Date: Mar. 30, 2010

(87) PCT Pub. No.: WO2009/065648
PCT Pub. Date: May 28, 2009

(65) Prior Publication Data
US 2010/0218333 A1     Sep. 2, 2010

(30) Foreign Application Priority Data
Nov. 22, 2007 (DE) .......................... 10 2007 056 321

(51) Int. Cl.
*A47L 1/00* (2006.01)
*B60S 1/02* (2006.01)

(52) U.S. Cl. ............ 15/250.201; 15/250.451; 15/250.48; 15/250.361

(58) Field of Classification Search ............. 15/250.201, 15/250.43, 250.44, 250.361, 250.32, 250.451, 15/250.48; *B60S 01/38, 01/40*
See application file for complete search history.

(56) References Cited

U.S. PATENT DOCUMENTS

| 3,192,551 A | 7/1965 | Appel | |
| 5,412,834 A * | 5/1995 | Burkard et al. | 15/250.452 |
| 7,228,588 B2 | 6/2007 | Kraemer et al. | |
| 7,370,385 B2 * | 5/2008 | Chiang | 15/250.43 |
| 2005/0011033 A1 * | 1/2005 | Thomar et al. | 15/250.201 |
| 2006/0107485 A1 * | 5/2006 | Kim | 15/250.201 |
| 2007/0174989 A1 | 8/2007 | Moll et al. | |
| 2009/0089956 A1 | 4/2009 | De Block et al. | |

FOREIGN PATENT DOCUMENTS

| CN | 1666912 | 9/2005 |
| CN | 2936852 | 8/2007 |
| DE | 1099375 B | 2/1961 |
| DE | 19835065 A1 | 2/2000 |
| DE | 10120467 | 10/2002 |
| DE | 102005009205 A1 | 10/2005 |
| GB | 2005532 A1 | 4/1979 |
| WO | 2008046691 A1 | 4/2008 |
| WO | 2009000498 A1 | 12/2008 |

OTHER PUBLICATIONS

PCT/EP2008/062687 International Search Report.

* cited by examiner

*Primary Examiner* — Brian Glessner
*Assistant Examiner* — Brian D Mattei
(74) *Attorney, Agent, or Firm* — Michael Best & Friedrich LLP

(57) ABSTRACT

The invention relates to a wiper blade (10) in a flat beam construction, having a wiper strip (12) and a single spring rail (20, 64, 68) serving as the carrier element, and a spoiler (22) connected to the head strip (18) of the wiper strip (12), wherein a connecting element (24) having a joint part (30) is disposed in the center region of the wiper blade (10). The invention proposes that the head strip (18) have a hollow profile that is open in the direction of the spoiler (22), on the longitudinal sides of which guide profiles (40) are disposed having open grooves (42) facing each other, in which the spring rail (20, 64, 68) is embedded.

19 Claims, 4 Drawing Sheets

WIPER BLADE

BACKGROUND OF THE INVENTION

The invention proceeds from a wiper blade.

DE 10 2005 009 205 A1 discloses a wiper blade of generic type having a wiper strip, a spoiler and a single, elongated spring rail serving as the carrier element, which in the basic state is concavely pre-curved on the side facing a vehicle windscreen. The spring rail is arranged between a head strip of the wiper strip and the spoiler. It is connected to the wiper strip by means of a retaining profile, which encloses the spring rail and engages laterally in longitudinal grooves of the head strip. Seated in turn on the retaining profile is the spoiler, which broadly encloses the retaining profile laterally and from the side facing the vehicle windscreen. A connecting element with an articulation part, either an articulation hub or an articulation axis, affixed to its side walls is arranged in the central area for the articulated connection to a wiper arm.

U.S. Pat. No. 3,192,551 discloses a wiper blade having a carrier element in the form of a single, elongated, flat spring rail, which is adhesively bonded to a back of a head strip of a wiper strip. In the central area the wiper blade has a connecting element, which is affixed to the spring rail by rivets.

Finally DE 28 43 164 A1 discloses a wiper blade having a carrier element in the form of a single spring rail, which in the central area between two side parts has a bead running over longitudinal extent, or a projection of roof-shaped cross-section, which from the middle tapers off towards the ends.

SUMMARY OF THE INVENTION

According to the invention the head strip of the wiper strip has a hollow profile, which is open towards the spoiler and on the longitudinal sides of which guide profiles are arranged, which have open grooves facing one another, in which the spring rail is embedded. This provides the wiper strip with a simple profile which can be produced by extrusion and in which the guide profiles may be composed of a different material from the remaining parts of the wiper strip and attached by extrusion in a single operation. This is particularly advantageous if, according to a development of the invention, the guide profiles on their outer longitudinal sides have ribs, on which the spoiler is guided and retained by mating profiles. The arrangement of the ribs and mating profiles may also be transposed, so that the ribs are provided on the spoiler and the mating profiles on the guide profiles. To enhance the connection of the ribs to the mating profiles, the ribs have appropriate thickenings at their outer edges, which fit in grooves of the mating profiles having undercuts. The spoiler can be easily and securely clipped onto the mating profiles, so that the spring rail is covered and protected by the wiper strip on the one hand and the spoiler on the other. It therefore does not need painting.

According to a development of the invention the head strip comprises a connecting part of U-shaped cross section open towards the spring rail between the guide profiles on the one hand and a tipping web on the other. The design configuration of the connecting part allows the pliability of the head strip to be modified in the direction of the unstressed tipping web, so that the tipping action of the wiper lip in the reversal phases of the wiper blade generates only slight, if any, lifting movements that might give rise to noise.

According to a further development of the invention the spoiler has an inner reinforcing wall, which connects an area on the outflow side in proximity to the mating profile to an area in proximity to the opposite mating profile. The reinforcing wall lends a very good lateral stability to the spoiler and hence to the wiper blade. It furthermore secures the connection between the ribs and their mating profiles.

According to a further development of the invention the connecting element has a base with two side walls with which to accommodate the articulation part, for example an articulation hub or an articulation axis. The base has a flat area, which runs centrally between the side walls and projects towards the spring rail. In the assembled state the projecting area bears on the spring rail and is connected to the latter by beveled insetting, riveting, screwing, welding or adhesive bonding. The projecting area affords a space for the guide profiles of the wiper strip on the longitudinal sides of the base of the spring rail, so that said profiles can extend without indentations over the entire length of the wiper blade. The connection by means of beveled insetting or riveting further has the advantage that the components protected by the wiper strip and/or the spoiler do not need painting.

The beveled insetting or riveting mean that holes have to be made in the spring rail which affect the strength and elasticity of the spring rails in this cross section. This effect can be compensated for by lateral edges of the spring rail, which are angled transversely to the remaining part and which are provided at least in the area of the connecting element. In order to modify the spring characteristics of the spring rails, however, the edges may run over the entire length of the spring rail and diminish in height towards the ends.

A similar effect can be obtained in that the spring rail comprises side parts which lie in a plane parallel to the bearing part, whilst a flat central part projects, preferably towards the connecting element. The central part projecting towards the connecting element bears on the base or the projecting area of the connecting element. If the spring rail has a flat central part projecting towards the connecting element, the projecting area of the connecting element may be dispensed with, so that the base of the connecting element is plane throughout.

BRIEF DESCRIPTION OF THE DRAWINGS

Further advantages will emerge from the following description of the drawings. The drawing represents exemplary embodiments of the invention. The drawing, the description and the claims contain numerous features in combination. The person skilled in the art will also give appropriate consideration to the features individually and will combine these in further suitable combinations.

In the drawings.

DETAILED DESCRIPTION

Figure 1:
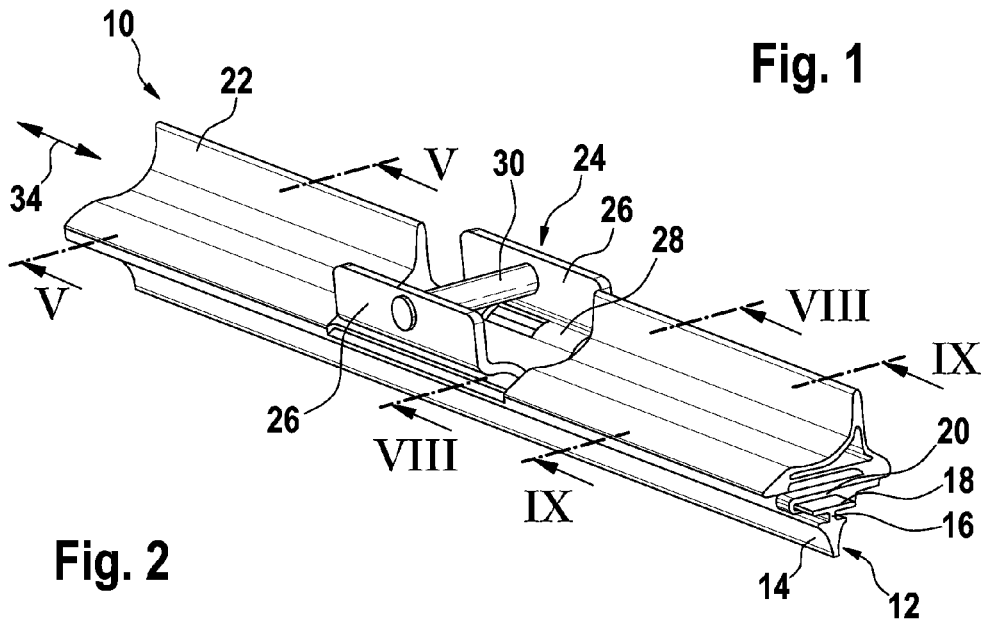
FIG. 1 shows a perspective partial view of a wiper blade according to the invention.
Figure 2:
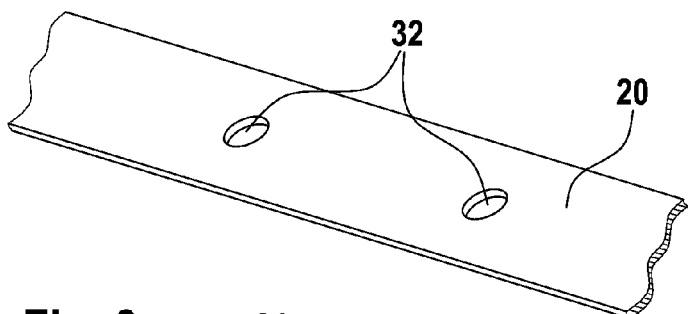
FIG. 2 shows a partial view of a spring rail.
Figure 3:
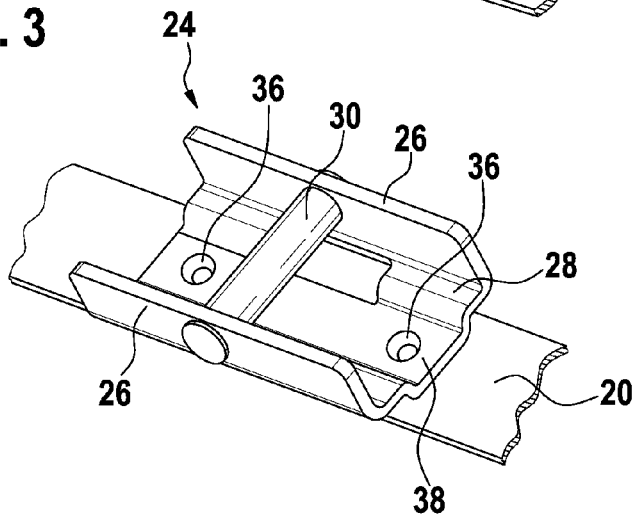
FIG. 3 shows a perspective partial view of a spring rail with a connecting element.
Figure 4:
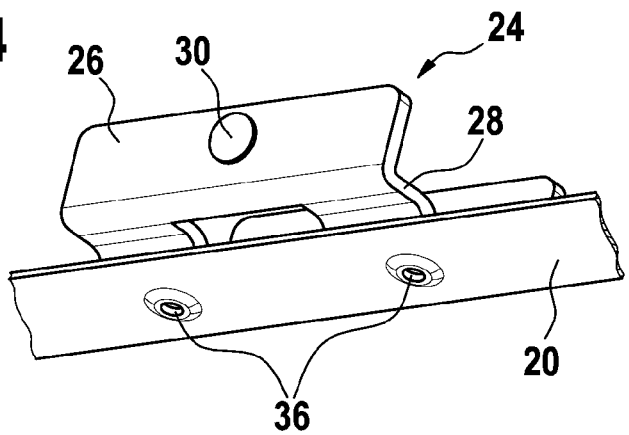
FIG. 4 shows a perspective partial view according to FIG. 3 from below.
Figure 5:
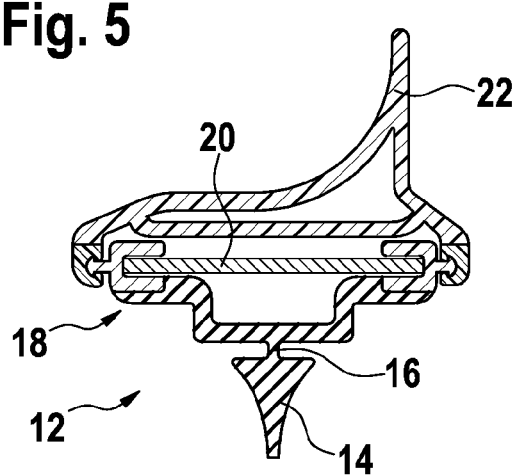
FIG. 5 shows a cross section of a wiper blade corresponding to line V-V in FIG. 1.
Figure 6:
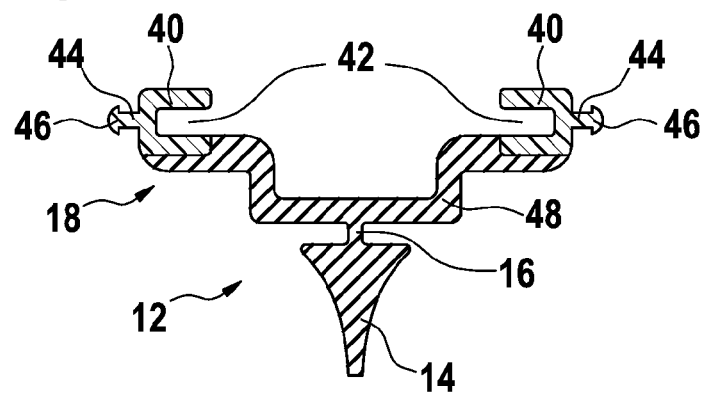
FIG. 6 shows a cross section through a wiper strip.
Figure 7:
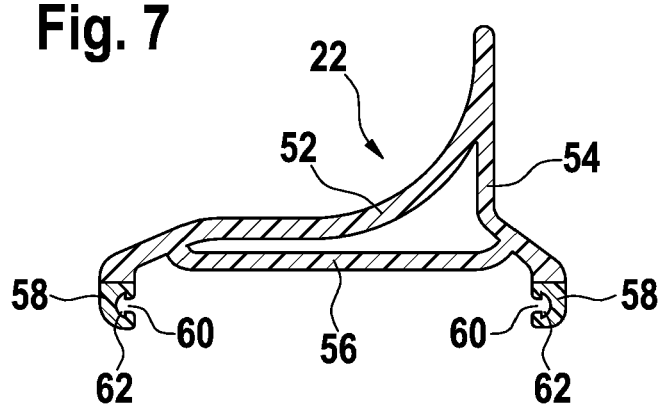
FIG. 7 shows a cross section through a spoiler.
Figure 8:
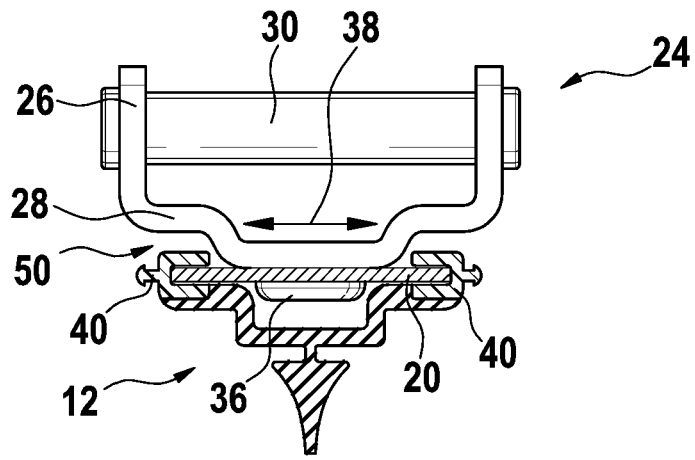
FIG. 8 shows a cross section through a wiper blade corresponding to the line VIII-VIII in FIG. 1.
Figure 9:
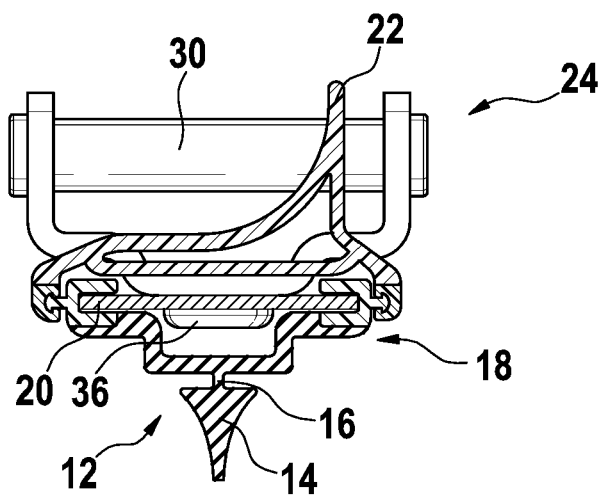
FIG. 9 shows a view of a wiper blade in the direction of an arrow IX.
Figure 10:
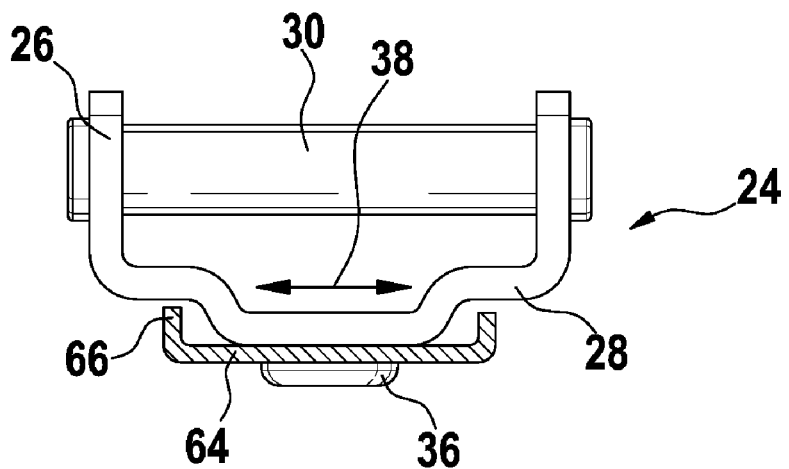
FIG. 10 shows a cross section through a connecting element with an alternative spring rail.
Figure 11:
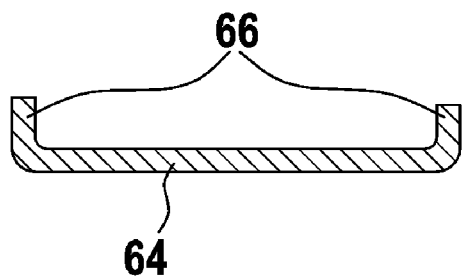
FIG. 11 shows a cross section through a spring rail according to FIG. 10
Figure 12:
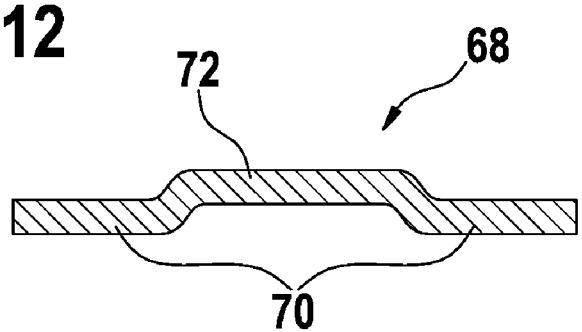
FIG. 12 shows a variant of FIG. 11.

A wiper blade 10 has a wiper strip 12 with a wiper lip 14, which is connected by a tipping web 16 to a head strip 18. This has a hollow cross sectional profile, which is open on the side remote from the wiper lip 14. On the longitudinal sides of the head strip 18 guide profiles 40 are situated in the area of the open side, with longitudinal grooves 42, which face one another and in which a spring rail 20 is embedded. In the exemplary embodiment shown the guide profiles 40, which may be composed of the same material as the rest of the wiper strip 12, are made from a different material better suited to the guide functions and are manufactured by an extrusion process in one operation together with the rest of the wiper strip 12.

On the longitudinal sides the guide profiles 40 have ribs 44. They serve for affixing a spoiler 22, which by means of mating profiles 58 on its longitudinal sides is clipped or pushed over the ribs 44. For this purpose the mating profiles 58 have grooves 60 facing one another, in which the ribs 44 engage. In order to afford a stronger connection between the grooves 60 and the ribs 44, the latter on their outsides have thickenings 46, which fit into undercuts 62 of the grooves 60. Between the guide profiles 40 on the one hand and the tipping web 16 on the other the head strip 18 has a connecting part 48, which has a U-shaped cross sectional profile open towards the spring rail 20.

Facing into the airstream the spoiler 22 has an incident flow profile 52, which at its edge remote from the wiper strip 12 is connected to an outflow side 54. A connection also exists via a reinforcing wall 56, which on the inside of the spoiler 22 extends transversely through the cross sectional profile, from an area in proximity to the mating profile 58 on the outflow side 54 to the area in proximity to the opposite mating profile 58.

For the articulated connection to a wiper arm (not shown) the wiper blade 10 in a central area has a connecting element 24, which has two sides walls 26 angled approximately at right-angles and emerging from a base 28. These side walls run in a longitudinal direction 34 and are connected together by an articulation part 30 in the form of an articulation hub or an articulation axis. The base 28 of the connecting part 24 is affixed by rivets 36 to the spring rail 20. This has corresponding rivet holes 32 for this purpose. The connection can also be produced by beveled insetting. In so doing a part of the base material is pressed through the rivet holes 32 of the spring rail 20 and is flanged outwards on the other side of the spring rail 20.

The base 28, in the area of the fixing, suitably has an area 38, which in relation to the remaining area of the base 38 projects towards the spring rail 20, so that a space 50 is produced between the spring rail 20 and the remaining area 38 of the base 28. This allows the fitting of a continuous wiper strip 12 free of any indentations.

The rivet holes 32 affect the elastic properties and the strength of the spring rail 20 in this area. To compensate for these factors a spring rail 64 may have lateral edges 66 in the area of the connecting element 24, which only extend over the length of the area of the connecting element 24 or extend over the entire length of the spring rail 20, their height possibly diminishing towards the ends of the spring rail 64. In a further embodiment a spring rail 68 has two side parts 70, which lie in one plane and adjoin a central part 72, which preferably projects towards the connecting element 24. The space 50 between the side parts 70 and the base 28 of the connecting element 24 may be formed entirely or partially by the offset between the side parts 70 and the central part 72.

The invention claimed is:

1. A wiper blade (10) of flat bar construction having a wiper strip (12) and a single spring rail (20, 64, 68) serving as carrier element, together with a spoiler (22), which is connected to a head strip (18) of the wiper strip (12), a connecting element (24) having an articulation part (30) being arranged in a central area of the wiper blade (10), characterized in that the head strip (18) has a portion defining a hollow profile which is open towards the spoiler (22) and on each longitudinal side of which a guide profile (40) is connected, each guide profile (40) having an open groove (42) facing one another, and in which the spring rail (20, 64, 68) is embedded, the portion of the head strip (18) and the guide profiles (40) being formed of different materials.

2. The wiper blade (10) as claimed in claim 1, characterized in that the guide profiles (40) have outer longitudinal sides having thereon ribs (44), on which the spoiler (22) is guided and retained by mating profiles (58).

3. The wiper blade (10) as claimed in claim 2, characterized in that the ribs (44) have outer edges and thickenings (46) at their outer edges, which fit in grooves (60) of the mating profiles (58) having undercuts (62).

4. The wiper blade (10) as claimed in claim 3, characterized in that the mating profiles (58) are composed of a different material from the spoiler (22) on which the mating profiles (58) are mounted.

5. The wiper blade (10) as claimed in claim 4, characterized in that the head strip (18) comprises a connecting part (48) of U-shaped cross section open towards the spring rail (20, 64, 68) between the guide profiles (40) on the one hand and a tipping web (16) on the other.

6. The wiper blade (10) as claimed in claim 5, characterized in that the spoiler (22) has an inner reinforcing wall (56), which connects an area on the outflow side (54) in proximity to the mating profile (58) to an area in proximity to the opposite mating profile (58).

7. The wiper blade (10) as claimed in claim 6, characterized in that the connecting element (24) has a base (28) with two side walls (26) with which to accommodate the articulation part (30), the base (28) having a flat area (38), which runs approximately centrally between the side walls (26) and projects towards the spring rail (20, 64, 68), to which it is connected by one of beveled insetting, riveting, screwing, welding and adhesive bonding.

8. The wiper blade (10) as claimed in claim 7, characterized in that the spring rail (64), at least in the area of the connecting element (24) has lateral edges (66), which are angled transversely to the remaining part.

9. The wiper blade (10) as claimed in claim 7, characterized in that the spring rail (68) has two side parts (70), which lie in one plane parallel to the articulation part (30), whilst a flat central part (72) projects from the side parts.

10. The wiper blade (10) as claimed in claim 2, characterized in that the guide profiles (40) or the mating profiles (58) are composed of a different material from the associated components (12, 22) on which the guide profiles (40) or the mating profiles (58) are mounted.

11. The wiper blade (10) as claimed in claim 10, characterized in that the wiper strip (12) and the spoiler (22) are produced together with the guide profiles (40) and the mating profiles (58), respectively, in one extrusion process.

12. The wiper blade (10) as claimed in claim 2, characterized in that the spoiler (22) has an inner reinforcing wall (56), which connects an area on the outflow side (54) in proximity to the mating profile (58) to an area in proximity to the opposite mating profile (58).

13. The wiper blade (10) as claimed in claim 1, characterized in that the head strip (18) comprises a connecting part (48) of U-shaped cross section open towards the spring rail (20, 64, 68) between the guide profiles (40) on the one hand and a tipping web (16) on the other.

14. The wiper blade (10) as claimed in claim 1, characterized in that the connecting element (24) has a base (28) with two side walls (26) with which to accommodate the articulation part (30), the base (28) having a flat area (38), which runs approximately centrally between the side walls (26) and projects towards the spring rail (20, 64, 68), to which it is connected by beveled insetting, riveting, screwing, welding or adhesive bonding.

15. The wiper blade (10) as claimed in claim 1, characterized in that the spring rail (64), at least in the area of the connecting element (24) has lateral edges (66), which are angled transversely to the remaining part.

16. The wiper blade (10) as claimed in claim 1, characterized in that the spring rail (68) has two side parts (70), which lie in one plane parallel to the articulation part (30), whilst a flat central part (72) projects from the side parts.

17. The wiper blade (10) as claimed in claim 16, characterized in that the flat central part (72) projects towards the connecting element (24).

18. The wiper blade (10) as claimed in claim 1, characterized in that the spring rail (20) has a width, and in that, along the width of the spring rail (20), a first portion of the head strip (18) abuts the spring rail (20) and a second portion of the head strip (18) is spaced from the spring rail (20).

19. The wiper blade (10) as claimed in claim 18, characterized in that the spoiler (22) has an inner reinforcing wall (56) spaced from the spring rail (20).

* * * * *

UNITED STATES PATENT AND TRADEMARK OFFICE
CERTIFICATE OF CORRECTION

PATENT NO.       : 8,370,987 B2
APPLICATION NO. : 12/680866
DATED            : February 12, 2013
INVENTOR(S)      : Jean-Marc Ritt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 215 days.

Signed and Sealed this
First Day of September, 2015

Michelle K. Lee
*Director of the United States Patent and Trademark Office*